United States Patent [19]

Güstävel et al.

[11] Patent Number: 5,462,422
[45] Date of Patent: Oct. 31, 1995

[54] APPARATUS FOR THE MANUFACTURE OF A PLASTIC MOLDED PART

[75] Inventors: Andreas Güstävel, Ratingen; Ralf Horstkötter, Balve; Rolf Schlenz, Belbert; Harald Strunk, Plettenberg, all of Germany

[73] Assignee: Gebr. Happich GmbH, Germany

[21] Appl. No.: 202,834

[22] Filed: Feb. 28, 1994

Related U.S. Application Data

[62] Division of Ser. No. 769,107, Sep. 30, 1991, Pat. No. 5,326,523.

[30] Foreign Application Priority Data

Oct. 1, 1990 [DE] Germany .............. 40 30 964.9

[51] Int. Cl.[6] ............... B29C 45/14; B29C 45/18; B29C 45/46
[52] U.S. Cl. .............. 425/129.1; 425/256; 425/258; 425/447; 425/547; 425/553; 425/554; 425/DIG. 48; 425/DIG. 119
[58] Field of Search ................... 425/122, 125, 425/129.1, 553, 550, 551, 256, 447, 448, DIG. 48, DIG. 119, 127, 258, 554, 547; 264/153, 163, 266

[56] References Cited

U.S. PATENT DOCUMENTS

| | | | |
|---|---|---|---|
| 3,142,089 | 7/1964 | Wilkalis et al. | 425/DIG. 48 |
| 3,163,888 | 1/1965 | Shattuck | 425/550 |
| 3,173,174 | 3/1965 | Edwards | 425/DIG. 48 |
| 3,358,061 | 12/1967 | Gidge et al. | 425/DIG. 48 |
| 3,473,204 | 10/1969 | Ianuzzi et al. | 425/409 |
| 4,009,981 | 3/1977 | Rosen | 425/DIG. 48 |
| 4,167,382 | 9/1979 | Freedman et al. | 425/256 |
| 4,216,184 | 8/1980 | Thomas | 264/229 |
| 4,459,092 | 7/1984 | Hatakeyama | 425/129.1 |
| 4,722,678 | 2/1988 | Wersosky | 425/256 |
| 5,034,177 | 7/1991 | Niimi et al. | 264/331.21 |
| 5,040,962 | 8/1991 | Waszeciak et al. | 425/129.1 |
| 5,082,435 | 1/1992 | Kuramitsu et al. | 425/553 |
| 5,188,787 | 2/1993 | King et al. | 425/553 |

FOREIGN PATENT DOCUMENTS

| | | |
|---|---|---|
| 186016 | 7/1986 | European Pat. Off. . |
| 0320925 | 12/1988 | European Pat. Off. . |
| 1961011 | 12/1969 | Germany . |
| 8133741 | 11/1981 | Germany . |
| 3808339 | 10/1989 | Germany . |
| 59-222322 | 12/1984 | Japan 425/550 |
| 59-222323 | 12/1984 | Japan 425/550 |
| 60-914 | 1/1985 | Japan 425/550 |
| 667842 | 11/1988 | Switzerland . |
| 1067830 | 11/1963 | United Kingdom . |
| 2206835 | 1/1989 | United Kingdom . |

Primary Examiner—Khanh P. Nguyen
Attorney, Agent, or Firm—Ostrolenk, Faber, Gerb & Soffen

[57] ABSTRACT

An apparatus for manufacturing a plastic molded part. A plasticized plastic composition is fed to the open mold cavity defined between a lower and an upper mold half. At least one web and perhaps two webs of decorative material to be applied to the molded part extend across the mold cavity. The closing of the mold halves presses the plastic composition against the web or webs. There is at least one two-part clamping frame for resiliently holding the web of decorative material by clamping it outside the mold cavity, so that the web can slip with respect to the composition as the mold halves move together. One clamping frame half is developed with an immersion edge which defines a side edge of the mold cavity and with a cutting plane spaced from the immersion edge a distance sufficient that the frame half also serves as an ejector for the molded part from the mold cavity as the mold halves open apart. Plastic composition is either directly delivered to the mold cavity or it is first delivered to a preforming chamber which is placed in the mold cavity and then the chamber is opened to deliver the preshaped part to the mold cavity. The preforming chamber has a non-adherent interior surface and/or is air permeable and a gas is supplied for the purpose of minimizing or eliminating adherence of the plastic composition to the internal surface of the preforming chamber.

15 Claims, 6 Drawing Sheets

APPARATUS FOR THE MANUFACTURE OF A PLASTIC MOLDED PART

This is a division of application Ser. No. 07/769,107, filed Sep. 30, 1991, now U.S. Pat. No. 5,326,523.

BACKGROUND OF THE INVENTION

The present invention refers to a method and an apparatus for the production of a plastic molded part in which a plastic composition is fed in a plasticized state to an open mold cavity and particularly relates to applying a covering layer to the part while it is in the mold. The mold comprises lower and upper mold halves. A supply of the plastic composition is compressed into a desired shape by the closing of the mold.

For instance, some automobile parts are covered with textiles or films for aesthetic improvement. The covering is effected in this case by applying a backing to the part or else by back injection of the textiles or films on injection molding machines. In both cases, the expense of the process is relatively great, while the quality of the surface of the parts obtained is not always satisfactory.

SUMMARY OF THE INVENTION

The object of the present invention is to provide a method and an apparatus for the manufacture of a plastic molded part, particularly an automobile part, such as a door covering, a column covering, a rear shelf, a glove compartment, a steering column covering, a car ceiling, a sun visor, a map pocket, and the like, with which visually pleasing surfaces of very good quality can be produced relatively simply and economically.

In the method of the invention, the plasticized plastic composition is compressed and a shape is imparted thereto. The composition is pressed against at least one web of decorative material which is arranged between the halves of the mold.

In the method of the invention, the cavity is filled solely by a mold closing process and the attachment of the plastic composition to the decorative material is also obtained only in that way. By selection of the proper process temperature, the proper temperature of the composition, the proper temperature of the wall of the mold cavity, the proper closing speed of the mold, the proper closing force of the mold, and the proper viscosity of the melt i.e. its homogeneity, good attachment of a covering is obtained with good to excellent quality of the surface, as has been shown by testing. The method of the invention is also particularly well suited for substantially stress free and, thus, undistorted production of structural parts having large surfaces. Highly filled and reinforced plastics including, for instance, long glass fibers, can also be used in order to obtain, if necessary, plastic molded parts which are extremely stable.

In special cases of use, functional improvements are desirable, in addition to the aesthetic improvement of a plastic molding i.e. its external decoration. The functional improvements include, for instance, the dampening of noise. In order to satisfy this requirement, which is also in accordance with one particularly advantageous development of the invention, two webs of decorative material are arranged between the mold halves of the open mold, then a charge of the plasticized plastic composition is introduced between the webs of decorative material and then the object is shaped by closing the mold against the webs of decorative material. Both product sides of the plastic molded part are simultaneously covered with decorative material both of which become the inner and outer sides of the product during the product shaping process. In this connection, one web of decorative material can be partially penetrated during the shaping process for locating fastening elements and/or to form domes or ribbings, or the like, in the plasticized plastic composition.

In another preferred feature of the invention, at least one or each web of decorative material is slidable during the shaping process. This possibility enables easy deformation, i.e. stretching or compressing of the decorative material during the shaping process.

As a further development of the invention, a clamping frame is used which is capable of closing the edge of the cavity in the manner of an immersion edge. In addition to this, the clamping frame can also act as a circumferential ejector.

In one embodiment of the invention, the plasticized plastic composition can be fed directly to the open mold cavity from the plasticizing device of a plastic processing machine. For instance, the plasticized plastic composition can be injected or introduced by extrusion into the open mold, possibly using nozzle extensions.

It is also possible to deposit a melt in precisely defined locations on a web in the open position of the mold using a heated cylinder including a piston, the cylinder being fed by a plasticizing device and the cylinder being moved by a freely programmed robot.

In accordance with another preferred embodiment of the invention, the plasticized plastic composition can be fed from the plasticizing device of a plastic processing machine with the volume of the composition adapted for the part to be formed, being first delivered into a preshaping chamber. The preshaping chamber can be introduced into the open mold cavity, and the plasticized plastic composition which has been preshaped in a specific shape for the distribution can be deposited there. For this purpose, the preforming chamber has a contour or opening cross-section which is at least approximately in accord with the molded part to be produced, although on a reduced scale. The plasticized plastic composition which is injected or extruded into the preforming chamber is maintained at a temperature of the composition suitable for shaping within the preforming chamber. To do that, a heated preforming chamber maintains the plasticized plastic composition at composition temperature. Devices which operate, for instance, telescopically are also provided for introducing the preforming chamber into the mold cavity. Furthermore, means on the preforming chamber, such as strippers, ejectors, turning devices, or the like, deposit the preform in the mold cavity. The preforming chamber has a bottom wall that is adapted to be opened, such as a swingable bottom wall.

A small temperature reduction which establishes itself between the wall of the preforming chamber and surface which receives the preform, produces a very thin solidification layer which on the one hand permits gravity caused mold removal and, on the other hand, melts in the hot volume of the composition upon the process of distributing and shaping the composition. In order to favor gravity mold removal, the plasticized plastic composition should only adhere slightly to the preforming chamber. In particular, the preforming chamber may have an inner surface comprised of a layer of metal oxide. As an alternative, the preforming chamber may have an inner surface coating or a covering comprised of non-ferrous metal.

A preforming chamber comprised of porous or air pervious material, and particularly sintered metal, may be used. For depositing the plasticized plastic composition in the mold cavity, the preforming chamber is opened when the chamber has been placed in the cavity, preferably by swinging open the bottom wall. At the same time, the chamber is acted on from the outside by a feed of gas. The gas that is applied passes through the sintered metal walls of the preforming chamber. A uniformly built up gas cushion makes it possible to eliminate adherence between the wall and the composition and to commence low pressure mold removal. Sudden detachment within a limited time of the plasticized plastic composition from the preforming chamber is caused by the gas. The plasticized plastic composition falls into the open mold cavity.

A heated cylinder with a piston, which is fed by the plasticizing device and moved by a freely programmed robot, deposits the melt in a precisely defined path in the open position of the mold.

Various decorative materials may be used for covering the molded part. In particular, webs of decorative material, single or multi-layer plastic foils backed with foam or the like, woven or knitted fabrics, felts, leather and the like may be used. During the forming process, an intimate connection is assured between the decorative material, on the one hand, and the plasticized plastic composition, on the other hand. This can easily be realized by the selection of a suitable material and/or coating of the decorative material.

EXAMPLE OF A METHOD DESCRIPTION

In this example both product sides of a plastic molded part that is to be produced are simultaneously compressed and shaped both from the product inner side and from the product outer side while the sides are, for instance, covered with a textile or foil.

By means of a plasticizing device, for instance an injection molding plasticizing device or an extruder, thermoplastic molding compositions are prepared at relatively low temperatures, i.e. plasticized.

In a vertical closure, which is connected directly or indirectly to the plasticizing unit, there is clamped a shaping mold. The mold has additional functional devices including a) a slip clamping frame for receiving a textile and/or a foil blank, for instance, for external decoration; b) a slip clamping frame for receiving a textile and/or foil blank, for providing an inside covering; c) a telescopic arm or axially displaceable plasticizing unit including an integrated molding composition preforming chamber. The plasticized molding composition fills the mold in accordance with the process, and the composition is formed into the product with two textile and/or foil blanks.

The course of the process is now described.

Both mold halves, which are respectively clamped on the upper and lower mold carriers, are in the open position.

Between the mold halves, but protruding above the corresponding base plates, a double upper clamping frame and a double lower clamping frame are installed so that the two frames can be moved with respect to each other and, therefore, can be opened and closed with slip clamping. Both of the frames, however, also travel along in the same direction with the mold closing process so that the "lower material" is moved towards the "upper material" and the materials face each other at a distance apart equal to the thickness of the product wall after the shaping process.

Before the shaping process, one blank of covering material is placed in the lower frame and another blank is placed in the upper frame by an installed robot. The two frames hold the blanks firmly clamped, for instance, by pneumatic control. However, both supported blanks of material can still slip slightly during the shaping process in order to thereby to facilitate decorative shaping by stretching and/or compressing.

After both blanks of material have been placed in the clamping frames, a telescopic arm, for example, or a nozzle extension of the extruder enters between the clamping frames. It places either a preforming chamber or a preform nozzle in a specific shaping manner directly over the "lower material" and is controlled directly centrally by means of a heating channel system located above the mold core, which is heated to suitable temperatures corresponding to the desired shaping characteristics.

The introduction of a volume of the composition is effected in one of two ways. The nozzle of the plasticizing device is adjusted in front of the preforming chamber in accordance with the process in which the volume of composition is injected or extruded into the performing chamber in a manner specific to the part.

Alternatively, a multiple heating channel distributor beam, adapted to the desired shaping geometry is arranged transverse to the plasticizing unit and is flanged there and is moved with the plasticizing unit over the lower mold. After the completion of the filling and the removal of the molding composition application devices, a plasticizable preform, which is preshaped to the specific shape for the distribution, lies on the lower blank of material. Alternatively, a composition preform can be produced as an extruded or injected part also outside the shaping unit and can be placed, by means of a robot, on the lower blank of material or the lower mold half.

Directly after the preform has been positioned, the decoration clamping frames of the mold halves travel toward each other, positively controlled, to shape the product with decoration on both sides. In that connection, neither undesired molding composition pressures nor decoration molding overstresses occur.

By suitable mold design and placing of decorative mold blanks in a suitable manner into the mold, machine produced finished parts are removed from the mold or an edge decoration cut is effected in the subsequent makeup.

The apparatus of the invention molds a plasticized plastic composition. It includes a mold comprising a lower mold half and an upper mold half. The mold halves define a mold cavity between them. A plastic processing machine includes a plasticizing device and means for introducing the plasticized plastic composition into the open mold cavity. At least one web or blank of decorative material that is to be applied to the molded part extends through or across the mold cavity between the mold halves. There is a two part clamping frame which clamps the web of decorative material outside the mold cavity. This enables the web to slip with respect to the plastic composition in the cavity. One of the parts of the clamping frame has an immersion edge which is shaped to close a side edge of the open mold cavity as the mold halves are moving together and before the plastic composition is compressed and escapes from the mold cavity. The clamping frame part also has a cutting plane that is spaced from the immersion edge and which cuts off the end of the molded plastic material.

The plastic composition may be transferred from the plasticizing device by means of a heatable preforming chamber for the plasticized composition. The preforming chamber has a feed opening for receiving the composition and also has an openable outlet for feeding the now preformed blank of composition into the open mold cavity. The openable outlet may comprise a hinged bottom wall which can be swung open. To minimize or prevent the adherence of the plasticized composition to the inner wall of the preforming chamber, the inner surface is comprised of a non-adherent material, such as a polished metal oxide layer or a nonferrous metal. Also to aid in the release of the plasticized composition, the preforming chamber may be comprised of a porous, gas permeable material such as a sintered metal. Means feed gas to the housing surrounding the preforming chamber and the gas passes through the porous wall of the preforming chamber to release the plastic composition from the wall.

Alternate means for delivering the plasticized composition to the mold cavity are contemplated. A moveable nozzle may directly feed the plasticized plastic composition into the open mold cavity. The nozzle is directable to various locations within the cavity for delivering the composition. Programmable robot means may direct the nozzle. Alternately, there may be a heated piston cylinder device, the cylinder of which is connected to be fed with the plasticized plastic composition. A programmable robot directs the plasticized plastic composition to precisely defined deposit locations in the mold cavity.

The apparatus of the invention has substantial advantages. One half of the clamping frame is developed to perform multiple functions. In addition to its inherent holding function for the specific web of decorative material, the clamping frame can also satisfy an immersion edge function and, in addition, can also act as an ejector for the finished plastic molding. The functional combination produces a comparatively small expense for tooling, substantial protection of the web of decorative material from damage, and extensive independence from the block thickness of the corresponding web of decorative material. Furthermore, formation of a bend of the web of decorative material on the molding edges is made possible or at least favored.

Because the heatable preforming chamber has an openable outlet and particularly an openable bottom wall, the plasticized plastic composition can be fed by gravity to the mold cavity with a volume of composition which conforms to the particular part and, maintained at the appropriate composition temperature and preshaped in a manner adapted to the particular part. The interior surface of the preforming chamber is comprised of a non-adherent material and/or the preforming chamber is comprised of a porous, gas permeable material. A gas applied to the housing around the preforming chamber cooperates in the removal of the plastic molded part from the preforming chamber and particularly cooperates with the removal of the mold by gravity through the bottom of the preforming chamber when the bottom is open.

A direct strand like depositing of the plasticized plastic composition into the open mold cavity is made possible when the plastic processing machine includes a moveable nozzle for directly feeding the plasticized plastic composition into the open mold cavity. The nozzle is directed toward the cavity for feeding the composition into it.

A programmable, robot controlled, heated piston cylinder device is particularly advantageous for complicated shaped plastic molded parts. Of course, that same apparatus can also be used for shaping molded parts having geometrically simple shapes.

The cutting knife positioned on the mold outside the mold cavity, permits a contour cut of the edge of the molded part, if desired and of the web. The arrangement of the cutting knife can be such that the contour cut takes place without lengthening the cycle times.

Other objects and features of the invention are described below with reference to the accompanying drawings.

DESCRIPTION OF THE PREFERRED EMBODIMENTS

Figure 1:
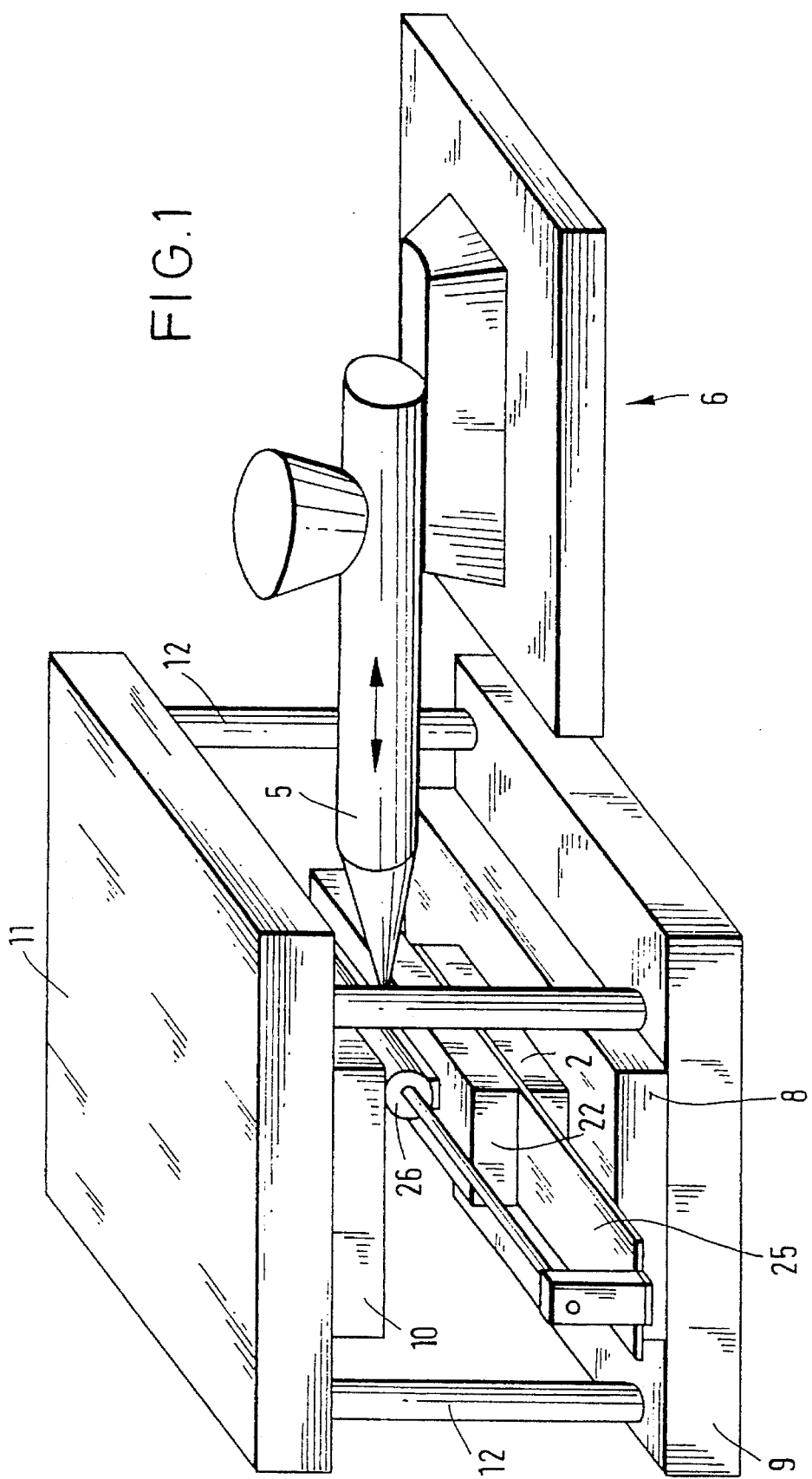
FIG. 1 is an overall perspective view of an apparatus for the manufacture of plastic moldings.
Figure 2:
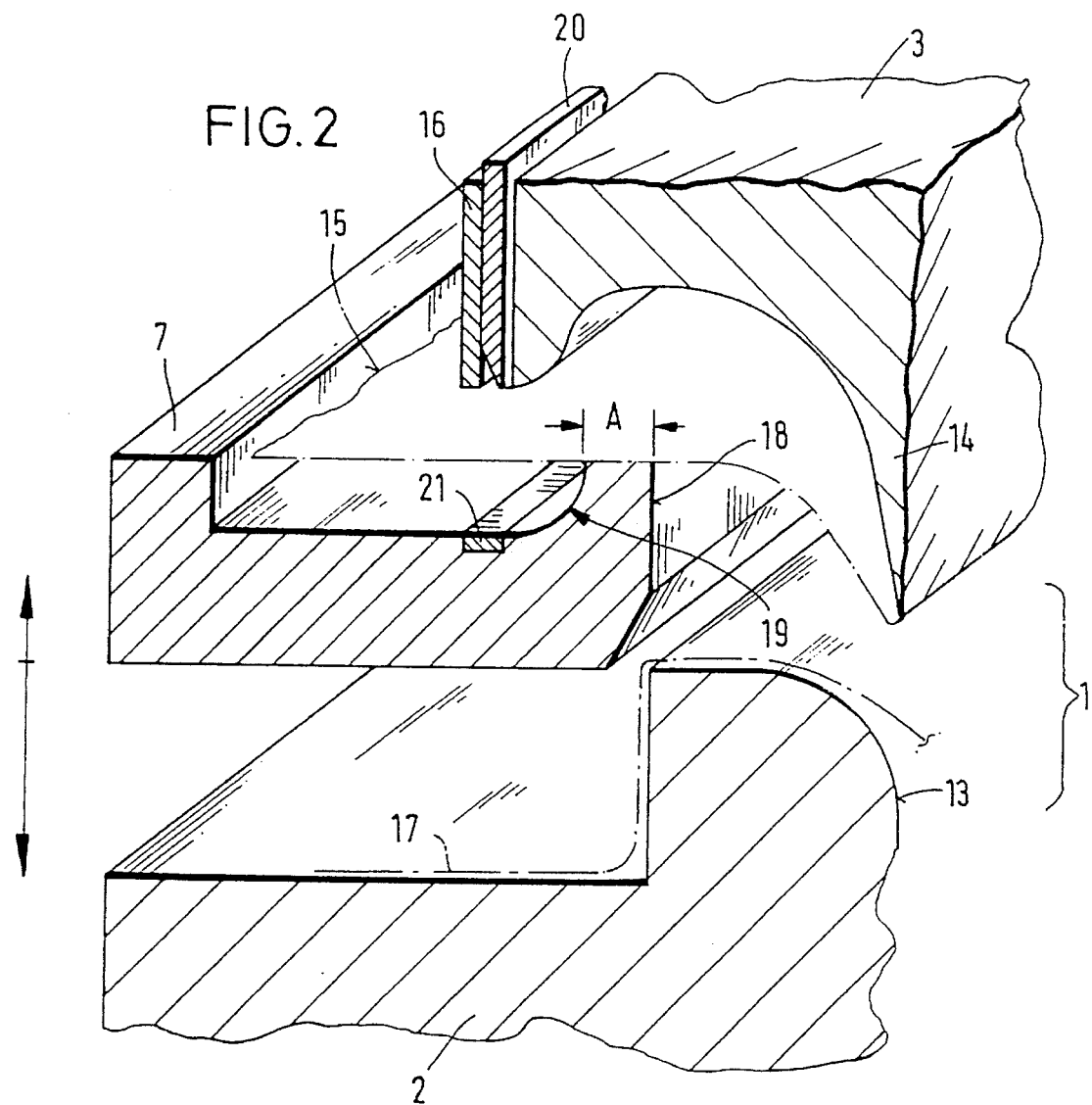
FIG. 2 is a partial vertical section through the open mold of the apparatus of FIG. 1.
Figure 3:
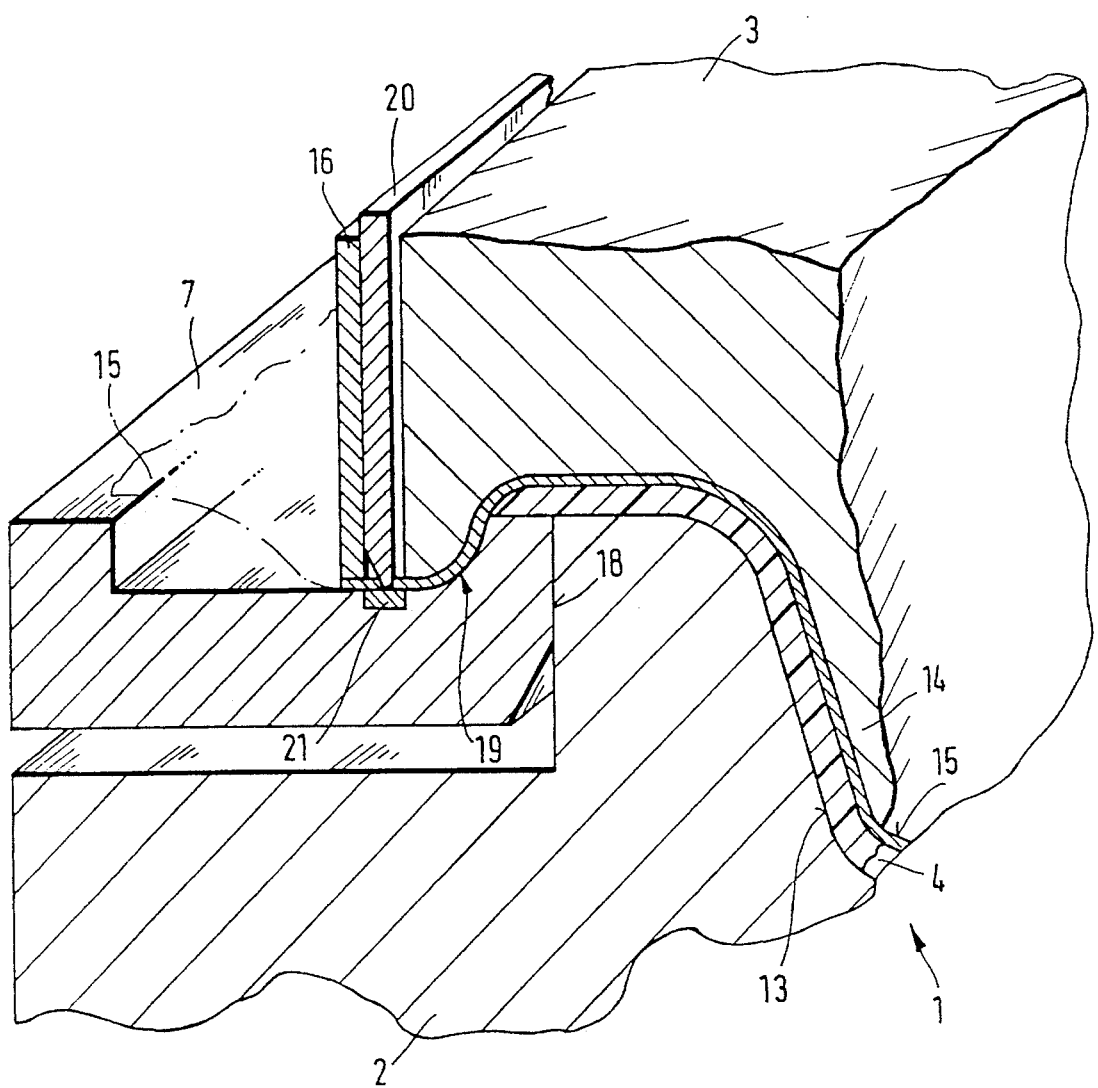
FIG. 3 is a partial vertical section through the closed mold of FIG. 1.

The apparatus in accordance with FIGS. 1 to 3 comprises a mold 1 with a lower mold half 2 and an upper mold half 3. A mold cavity 4 is developed between the closed mold halves. The apparatus further comprises a conventional plastic processing machine 6 including a plasticizing device 5 and means, described below, for feeding of the plasticized plastic composition into the open-mold cavity 4. There is at least one two part clamping frame with a lower clamping frame half 7, as shown in FIGS. 2 and 3.

The lower mold half 2 is seated on a lower clamping plate 8, which is carried by a mold receiving plate 9. The upper mold half 3, which cannot be seen in FIG. 1 due to the perspective of the view, is seated on an upper clamping plate 10. Plate 10 in turn, is fastened beneath an upper mold receiving plate 11. Via known column guides 12, the mold halves 2 and 3 are moveable relative to each other, from the open position shown in FIGS. 1 and 2 into the closed position shown in FIG. 3, and vice versa.

The lower mold half 2 has a hollow space 13 of which one end part is shown in FIG. 2. The upper mold half has a core 14, of which one end part is shown in FIG. 2, which can be introduced into the space 13. The cavity 4 is developed between the hollow space 13 and the core 14.

The clamping frame comprises the above noted lower clamping frame half 7, and an upper clamping frame half. In a simple case, the upper clamping frame half is formed from the upper mold half 3. Upon the closing of the mold 1, a web of decorative material 15 is clamped outside the cavity 4, i.e. to the left of the cavity 4 in FIG. 2, between the upper mold half 3, which acts as the upper clamping frame half, and the lower clamping frame half 7.

The embodiment shown in FIGS. 2 and 3, includes a separate upper clamping frame half 16 which can be clamped against the lower clamping frame half via control means (not shown) so that the blank 15 of the web of decorative material inserted and clamped between the clamping frames is able to slip with respect to the plastic composition during the shaping process.

If both product sides of the plastic molding to be produced are to receive a web of decorative material, a second clamping frame can be used (similar to the frame half 16), in a manner not shown in detail. However, it is also possible to apply a decorative blank, like web 15, on the lower mold half 2 and to effect a circumferential clamping on the edge of the blank by bringing together the mold halves 2 and 3. This possibility is indicated in FIG. 2, wherein a lower web 17 of decorative material is indicated by a dot-dash line.

The lower clamping frame half 7 shown in FIGS. 2 and 3 is developed with an immersion edge 18 and with a cutting plane 19 spaced from the edge 18 by the distance A shown in FIG. 2.

To manufacture a plastic molding, a plasticized predetermined volume of plastic composition is deposited into the hollow space 13 of the lower mold half 2 or onto a previously inserted lower web 17 of decorative material disposed along space. The upper mold half 3 and, thus, the clamping frame with the web of decorative material 15 previously clamped there in are then moved downward. This closes the mold. The inserted plastic composition is then compressed and shaped by the mold halves, a process which can be referred to as displacement shaping. It is essential that the immersion edge 18 of the lower clamping frame half 7 has already begun to dip into the lower mold half 2, before the plasticized plastic composition reaches the cutting plane 19. The distance A between the immersion edge 18 and the cutting plane 19 is also large enough to avoid the coming together of the immersion edge and the cutting plane which might cause the web of decorative material 15 to be easily damaged upon the closing of the mold. Furthermore, the thickness of the webs of decorative material used could not be changed. The distance A, however, is of further importance because the lower clamping frame half 7 can function also as an ejector for the solidified plastic molding, as is clear from FIG. 3. Raising the frame half 7 upward, with reference to the lower mold half 2, would lift the edge of the solidified molding.

FIGS. 2 and 3 show a knife 20 which permits contour cutting of the plastic molding. The knife 20 is mounted on the upper mold half 3 and can be positively controlled, for instance by the opening movement of the mold. It is also possible to provide mechanical and/or hydraulic control means, not shown in detail, for operating the knife 20. The blade of the knife 20 operates against an insert 21 which is provided in the lower clamping frame half 7.

Figure 4:
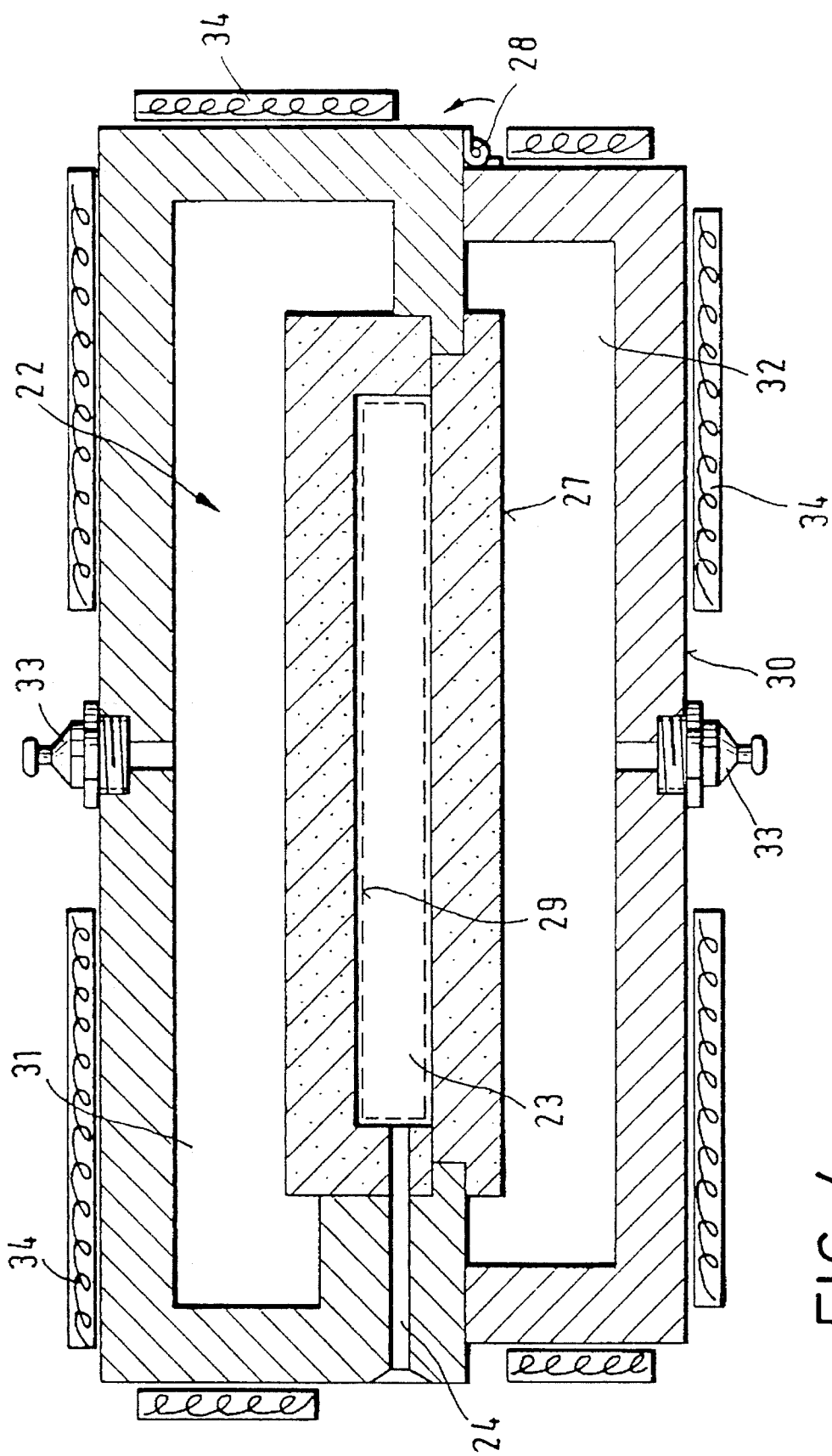
FIG. 4 shows a first means for the introduction of the plasticized plastic composition into the open mold cavity of the mold.

For introducing the plasticized plastic composition into the open mold cavity 4 various means can be provided. One preferred means is shown in FIG. 4. A preforming chamber 22 receives the plasticized composition of plastic in a volume of composition that specifically conforms to the part to be molded and that is preshaped to the shape of that part. The preforming chamber 22 surrounds and defines a hollow space 23 which is the part that receives the plasticized plastic composition. The composition is introduced into the space 23 from the plasticizing device 5 via a feed channel 24. The preforming chamber 22 and the plasticizing device 5 form a single structural unit which can be introduced, as indicated by the double-ended arrow in FIG. 1, into the region of the mold and can be removed from that region.

The preforming chamber 22 has a bottom which can be opened for depositing the plasticized plastic composition in the mold cavity. FIG. 1 shows that the bottom of the chamber 22 can comprise a slide 25 which cooperates with a piston-cylinder unit 26 for opening and closing the chamber. FIG. 4 shows that the bottom of the chamber may instead comprise a hinged lid 27, which is swung open and closed via a hinge 28.

The inner walls of the hollow space 23 of the preforming chamber 22 are selected to have poor adherence for the plasticized plastic composition. For this purpose, they can have a surface 29, indicated by a dashed line, which consists of a polished metal oxide layer or of a non-ferrous metal.

FIG. 4 shows a preforming chamber 22 having walls formed of sintered metal or some other porous or gas-pervious material. The preforming chamber is received by a housing 30 which can be opened, so that hollow spaces 31 and 32 are formed on the upper and bottom sides of the preforming chamber 22. A gas can be introduced into the hollow spaces 31 and 32 via connecting means 33. The gas passes through the porous walls of the preforming chamber 22 and builds up a gas cushion so as to eliminate any remaining wall composition adherence between the plasticized plastic composition and the preforming chamber 22. In practice, the hinge lid 27 is first acted on by the gas, and once the lid is opened, the other regions of the wall of the preforming chamber are acted on the gas so as to obtain an optimal deposit of the composition.

As it is important to hold the plasticized plastic composition at a composition temperature which is suitable for the molding, the preforming chamber 22 is heatable. In FIG. 4, heating elements 34 are shown diagrammatically.

Figure 5:
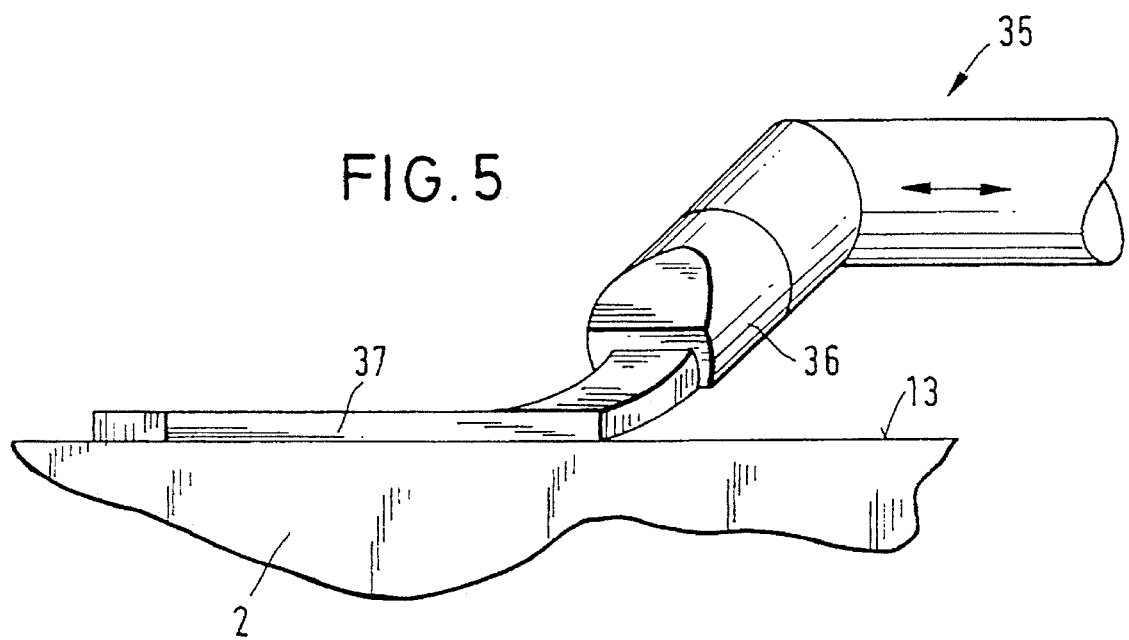
FIG. 5 shows a second means for introducing the plasticized plastic composition into the open mold cavity of the mold.

A nozzle device 35 comprises a further means for introducing the plasticized plastic composition into the open mold cavity is shown in FIG. 5. The nozzle device 35 can be connected to the plasticizing device 5 instead of to the preforming chamber 22 and can be moveable into and out of the region of the mold with the device 5. The nozzle device 35 includes a nozzle mouthpiece 36 for directly feeding the plasticized plastic composition into the open mold cavity 4 in the form of a strand of composition 37.

Figure 6:
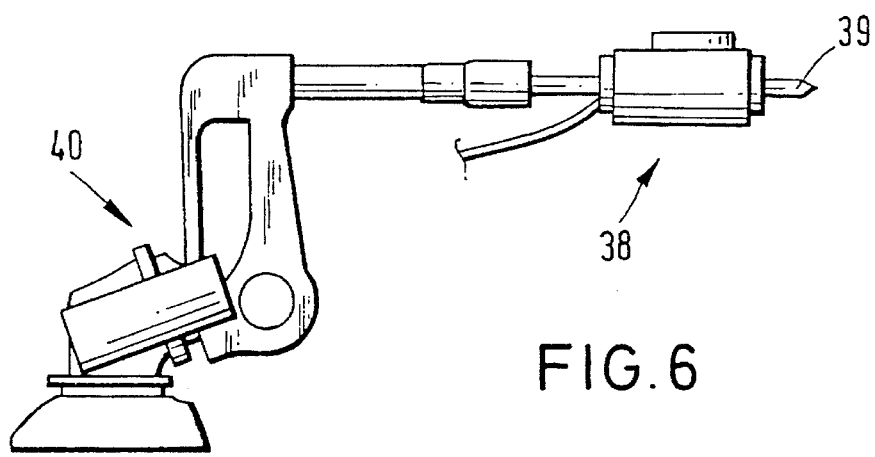
FIG. 6 shows a third means for introducing the plasticized plastic composition into the open mold cavity.

Another means for introducing the plasticized plastic composition into the open mold cavity is shown in FIG. 6. It comprises a heated piston-cylinder device 38 which can be fed by the plasticizing device 5. The cylinder receives a volume of composition which is specific to the shaping, and the piston moves to deposit the composition via a nozzle mouthpiece 39 into the open mold cavity 4. The piston cylinder device 38 is connected with a freely programmable robot 40 which is moveable around several axes. This device is suitable for directly introducing the plasticized plastic composition into the open mold cavity in precisely definable positions on the web. This device is particularly suitable for the manufacture of structures having a complicated shape, as is frequently encountered among covering parts for the inside of vehicles.

Figure 7:
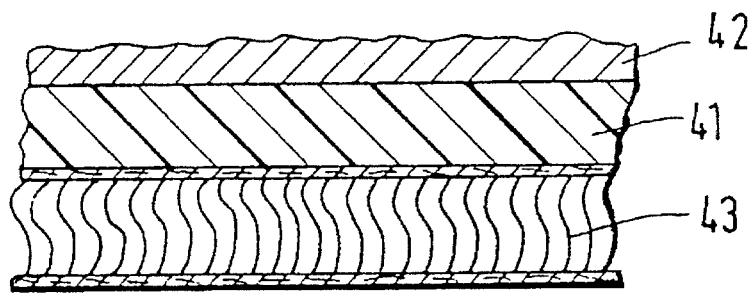
FIGS. 7 to 9 are, in each case, sections through a plastic part which has been shaped by pressing.
Figure 8:
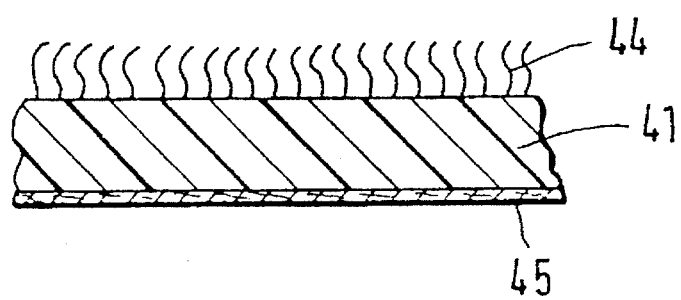
Figure 9:
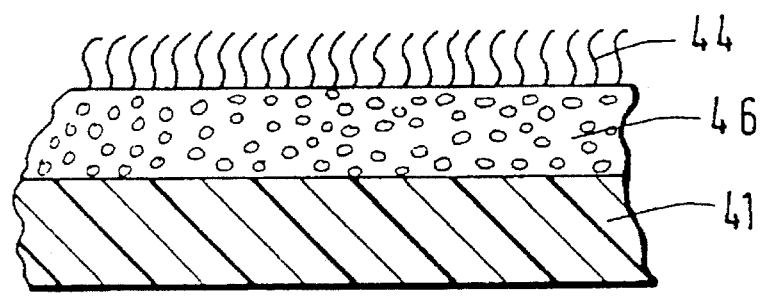

FIGS. 7 to 9 show different cross sections of plastic moldings. FIG. 7 shows a plastic support 41 which is shaped in accordance with the method described. On its visible or outward side, the support carries a grained deep-drawn film 42. On its rear hidden side, it carries, a web of material 43 that serves, for instance, as acoustic insulation. The plastic part shown in FIG. 7 can, for instance, be a vehicle door covering.

FIG. 8 shows a plastic part having a plastic support 41 which carries a decorative material 44 on one side and a glass mat 45 on the other side.

Finally, the plastic molding of FIG. 9 includes a plastic support 41 which carries a web of material on only one side. The web is comprised of a decorative material 44 with a foam back 46 which may consist of PP, PU or PE.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for molding a plasticized plastic composition comprising a mold comprising a lower mold half and an upper mold half above the lower mold half, the mold halves being shaped to define a mold cavity between the mold halves, the upper and lower mold halves being moveable toward each other to mold plastic composition between the mold halves and away from each other to open the mold cavity;

a plastic processing machine including a plasticizing device; means for feeding plasticized plastic composition from the plasticizing device into the open mold cavity;

a two part clamping frame outside the mold cavity for resiliently holding a web of decorative material that is arranged between the mold halves and inside the mold cavity;

a first part of the clamping frame having an immersion edge; a cutting plane spaced from the immersion edge and defining an edge of the closed mold cavity; a section of the first part between the immersion edge and the cutting plane for extending the mold cavity outwardly to the edge defined by the cutting plane when the mold halves are closed together and for expelling a finished molding from the cavity when the mold halves are moved away from each other to open the mold cavity.

2. The apparatus of claim 1, wherein the immersion edge is shaped to close an edge of the open mold cavity as the mold halves are moving together and before the plastic composition escapes from the cavity.

3. The apparatus of claim 1, further comprising a heatable preforming chamber for the plasticized composition, the preforming chamber being emplacable in the open mold cavity; the preforming chamber having a feed opening for receiving the composition, and having an outlet for feeding the composition into the open mold cavity.

4. The apparatus of claim 3, wherein the preforming chamber outlet comprises a bottom wall of the chamber adapted to open for exit of the plasticized composition from the preforming chamber.

5. The apparatus of claim 3, wherein the preforming chamber has an inner surface that is comprised of a material that is non-adherent to the plastic composition.

6. The apparatus of claim 5, wherein the non-adherent material comprises a polished metal oxide layer.

7. The apparatus of claim 3, wherein the preforming chamber is comprised of a porous, gas pervious material;

a housing around the preforming chamber, the housing including means for feeding gas to act on the preforming chamber for acting on the plasticized composition.

8. The apparatus of claim 7, further comprising means in the housing for heating the preforming chamber.

9. The apparatus of claim 1, further comprising the plastic processing machine including a movable nozzle for directly feeding plasticized plastic composition into the open mold cavity and being directed toward the cavity for feeding the plasticized composition.

10. The apparatus of claim 1, further comprising a heated piston cylinder device, the cylinder of which is connected to be fed with plasticized plastic composition from the plasticizing device;

a programmable robot acting on the cylinder for directly feeding plasticized plastic composition in a precisely defined deposit in the mold cavity.

11. The apparatus of claim 1, further comprising a knife outside the mold cavity for cutting of the molded plastic.

12. The apparatus of claim 5, wherein the non-adherent material comprises a nonferrous metal.

13. The apparatus of claim 1, further comprising a recess in the lower mold half, the recess being structured and arranged for receiving the first part of the clamping frame when the mold halves are closed together so that the immersion edge of the first part closes an edge of the open mold cavity as the mold halves are moving together and before plastic composition escapes from the cavity.

14. Apparatus for molding a plasticized plastic composition comprising a mold comprising a lower mold half and an upper mold half above the lower mold half, the mold halves being shaped to define a mold cavity between the mold halves, the upper and lower mold halves being moveable toward each other to mold plastic composition between the mold halves and away from each other to open the mold cavity;

a plastic processing machine including a plasticizing device; means for feeding plasticized plastic composition from the plasticizing device into the open mold cavity;

a two part clamping frame outside the mold cavity for resiliently holding a web of decorative material that is arranged between the mold halves and inside the mold cavity;

a heatable preforming chamber for the plasticized composition, the preforming chamber comprising a porous, gas pervious material and being emplacable in the open mold cavity; the preforming chamber having a feed opening for receiving the composition, and having an outlet for feeding the composition into the open mold cavity;

a housing around the preforming chamber, the housing including means for feeding gas to pass through the porous material of the preforming chamber to build a gas cushion in the preforming chamber for eliminating adherence between the preforming chamber and the plasticized composition then in the preforming chamber.

15. The apparatus of claim 14, further comprising means in the housing for heating the preforming chamber.

* * * * *

UNITED STATES PATENT AND TRADEMARK OFFICE
CERTIFICATE OF CORRECTION

PATENT NO.   :  5,462,422
DATED        :  October 31, 1995
INVENTOR(S)  :  Andreas Güstävel, et al It is certified that error appears in the above-indentified patent and that said Letters Patent is hereby corrected as shown below:

On the title page item [73], insert second Assignee "SHADE K.G"

Signed and Sealed this

Twenty-second Day of October, 1996

Attest:

BRUCE LEHMAN

*Attesting Officer*     *Commissioner of Patents and Trademarks*